No. 830,498. PATENTED SEPT. 11, 1906.
W. W. DOOLITTLE.
CHUCK.
APPLICATION FILED AUG. 25, 1903.
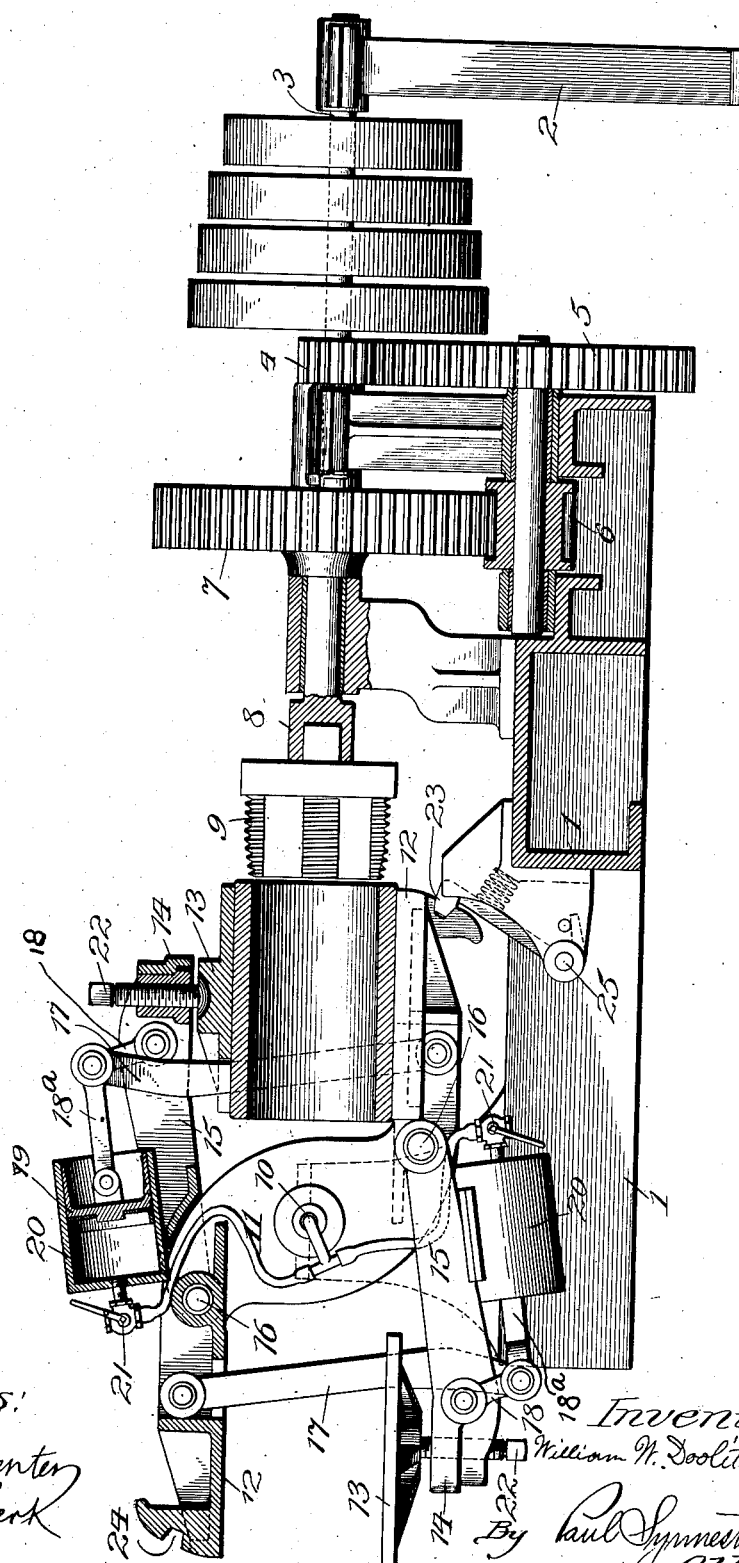
Witnesses:
Paul Carpenter
Chas. H. Eberk
Inventor:
William W. Doolittle
By Paul Synnestvedt
Atty.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

CHUCK.

No. 830,498.     Specification of Letters Patent.     Patented Sept. 11, 1906.

Application filed August 25, 1903. Serial No. 170,666.

*To all whom it may concern:*

Be it known that I, WILLIAM W. DOOLITTLE, a citizen of the United States, residing at Chicago, in the State of Illinois, have invented certain new and useful Improvements in Chucks, of which the following is a specification.

My invention relates to machines for cutting threads or tapping articles such as nuts and pipe joints etc., and particularly to the means for operating the chuck for holding the articles in such machines. The objects of the invention are, to provide a pneumatic gripping chuck, to provide a series of chucks so arranged that one can be in position for co-operation with the tapping tool while the other is in position to be simultaneously operated to engage or discharge an article to be tapped; to provide automatic means for gripping the article and presenting it in proper place before the tapping tool; to provide a superior form of pivotally mounted jaw for a chuck and to generally improve the construction and operation of tapping machines. The machine which I have designed to attain these objects and other advantages which will hereinafter appear, I illustrate in the accompanying drawing, which shows a partial side elevation and partial vertical central section through a device built in accordance with my invention.

The form of the machine for moving the tapping tool and the form of the said tool are immaterial to this invention and may be made of any ordinary structure. As illustrated in the drawing the base 1 and stanchion 2 supports the horizontal driving shaft 3 driven by the usual pulleys and through a train of gears including the pinion 4, wheel 5, pinion 6, gear 7, the head 8 is revolved and carries thereon any desired form of tap indicated diagrammatically at 9.

Mounted pivotally upon a trunnion 10 in two oppositely disposed upwardly projecting parts of the base 1 is a two-ended arm 11 which carries at its opposite sides respectively gripping jaws so placed as to be in line with the tapping tool 9 when in the position as shown in the drawing. The chucks are alike and are composed of a stationary jaw 12 and the movable arm 15 carrying the movable jaw 13 mounted thereon so as to be adjusted with respect to the same by means of a screw 22 passing through the head 14 on the arm 15, the said arm 15 being pivoted at 16 to the main arm 11. The movable jaw is reciprocated to open and close upon the article placed therein by means of the link 17 pivoted at one end to the stationary jaw and at the other to the link 18 which in turn is pivoted to the movable arm 15; the links 17 and 18 are operated and controlled through the medium of a link 18ª pivoted thereto and to a plunger 19 working in a cylinder 20 and operated by some fluid pressure as compressed air which may be admitted through a flexible pipe and through the threeway cock 21 and operated by hand to alternately admit and exhaust the same to move the jaw.

It will be understood that while one of the chucks is in position to co-operate with the tapping tool 9 the other at the opposite side is free to be manipulated to remove an article therefrom or place one therein, and the loosening and tightening of the gripping jaw is entirely controlled by means of the pneumatic pressure admitted by the cock 21. In order to uphold the chuck in proper position a notch 24 is provided in the head 12 and when in proper place co-operates with the dog 23 which is pivoted at 25 upon a bracket supported upon the base 1. A spring within the bracket may be used to hold the dog in place in the notch 24.

From the above description the operation of the device will be evident; and it will be seen that it presents a great advantage over the hand operated chucks which are ordinarily in use in such machines, and that the use of fluid pressure enables any desired pressure to be exerted upon the article and to be exerted constantly while the article is being held in the chuck. Also it will be seen that there is a great convenience in having the two chucks so arranged that one is in operative position while the other is opened or closed to introduce the new article. The air pressure being supplied conveniently through flexible tubes connected to cocks 21 and fed through a tube running through the center of the trunnion 10 as shown, the movement of the arm 11 and jaws is entirely free and the plungers may be operated at any time and in any position desired. The conveniences and advantages of this apparatus will readily appear to those familiar with tapping machines.

Having thus described my invention and illustrated its use, what I claim as new, and desire to secure by Letters Patent, is the following:

1. The combination of a revoluble chuck support, a series of chucks mounted thereon to revolve about a common center and into a position for operation successively, and fluid pressure means carried upon the chuck support for operating each one of said chucks.

2. The combination of a revoluble chuck support, a series of chucks mounted thereon, each of said chucks comprising a fixed jaw, a movable jaw and toggle link mechanism for operating the movable jaw, together with independent means carried on each of the movable jaws to operate the corresponding link.

3. A holding chuck comprising in combination a pivoted revoluble arm having oppositely disposed jaws at each end, movable jaws pivoted thereto, toggle link mechanism for operating the movable jaws and means for operating said toggle link carried on the movable jaws.

4. The combination of a revolving chuck support and a series of arms thereon carrying chucks for holding articles, each of the chucks comprising a fixed jaw and a movable jaw, and toggle link mechanism for operating the movable jaw and fluid pressure means for operating the same carried on the arm.

5. In a tapping machine the combination of a chuck support, and a series of revolving holding chucks for the articles to be tapped, each comprising a pair of pivoted jaws, a connecting link pivoted on one of said jaws, a toggle link connected thereto and to the other jaw, a fluid pressure operated plunger and proper connection to the toggle link for moving it and the movable jaw with multiplied power, mounted on the said jaw, and a fluid pressure inlet to actuate the plunger through the common axis of all the revolving chucks.

6. The combination of a revoluble chuck support, a series of chucks mounted thereon, fluid pressure means carried upon the chuck support for operating each one of the chucks, said chucks being adapted to be brought into position for operation successively, together with means for locking the chucks in such operative position.

In testimony whereof I have hereunder signed my name in the presence of the two subscribed witnesses.

WILLIAM W. DOOLITTLE.

Witnesses:
PAUL CARPENTER,
CHAS. H. EBERT.